United States Patent
Assarpour

(10) Patent No.: US 8,693,335 B2
(45) Date of Patent: Apr. 8, 2014

(54) METHOD AND APPARATUS FOR CONTROL PLANE CPU OVERLOAD PROTECTION

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 27 days.

(21) Appl. No.: 13/426,927

(22) Filed: Mar. 22, 2012

(65) Prior Publication Data

US 2013/0250763 A1  Sep. 26, 2013

(51) Int. Cl.
*H04J 1/16* (2006.01)

(52) U.S. Cl.
USPC ........ 370/235; 370/230; 370/230.1; 370/233; 370/234

(58) Field of Classification Search
USPC .............. 370/230, 253, 230.1, 231, 235, 233, 370/234
See application file for complete search history.

(56) References Cited

U.S. PATENT DOCUMENTS

| | | | | |
|---|---|---|---|---|
| 6,782,325 B2 * | 8/2004 | Hays et al. | | 702/45 |
| 7,426,634 B2 * | 9/2008 | Jain | | 713/151 |
| 7,436,844 B2 * | 10/2008 | Wang et al. | | 370/412 |
| 7,626,940 B2 * | 12/2009 | Jain | | 370/252 |
| 7,835,375 B2 * | 11/2010 | Sarkinen et al. | | 370/401 |
| 8,130,648 B2 * | 3/2012 | Kwan et al. | | 370/235 |
| 8,321,369 B2 * | 11/2012 | Donadio et al. | | 706/54 |
| 2002/0144156 A1 * | 10/2002 | Copeland, III | | 713/201 |
| 2004/0032826 A1 * | 2/2004 | Sridhar | | 370/222 |
| 2005/0060557 A1 * | 3/2005 | Lin | | 713/188 |
| 2005/0210321 A1 * | 9/2005 | Bai et al. | | 714/13 |

* cited by examiner

*Primary Examiner* — Ricky Ngo
*Assistant Examiner* — Dewanda Samuel
(74) *Attorney, Agent, or Firm* — Anderson Gorecki & Rouille LLP

(57) ABSTRACT

Control packets received at a network element are pre-classified to enable out of profile traffic to be traced to an offending port. Pre-classified control packets are metered at a desired granularity using dynamically configured meters which adjust as ports are put into service or removed from service, and as services are applied to ports. CPU metering is implemented on a per-CPU core basis, but the per-CPU meters are used to perform flow control rather than as thresholds for ejecting errant control traffic. The combination of these three aspects provides robust CPU overload protection while allowing appropriate levels of control traffic to be provided to the control plane for processing, even in the event of a control traffic burst on one or more ports of the network element.

20 Claims, 2 Drawing Sheets

METHOD AND APPARATUS FOR CONTROL PLANE CPU OVERLOAD PROTECTION

CROSS-REFERENCE TO RELATED APPLICATIONS

None.

BACKGROUND

1. Field

This application relates to communication networks and, more particularly, to a method and apparatus for control plane CPU overload protection.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Typically, a network element includes a control plane containing one or more CPUs which run applications that control how the network element operates on the network. The network element also includes a data plane that is implemented in hardware and optimized to handle packets of data being forwarded on the network. The applications executing in the control plane are used to program the data plane so that the data plane handles traffic correctly based on the current state of the network. The network elements exchange control packets with each other so that the network elements have a synchronized view of the network topology and can handle traffic in a coherent manner. When a control packet is received by the data plane, the data plane will forward the control packet to the control plane for processing so that state associated with the associated control application can be updated based on the content of the control packet.

For example, a routing application such a link state routing protocol application may be run in the control plane to control operation of the network element on the network. Example link state routing protocols include Open Shortest Path First (OSPF) and Intermediate System to Intermediate System (IS-IS). Alternatively, a bridging protocol such as Spanning Tree Protocol (STP) may be run in the control plane. To implement protocols of this nature, network elements send out control packets identifying the links to which they are connected. For instance, STP uses control packets that are commonly referred to as Bridged Protocol Data Units or BPDUs for short. When the network element receives a BPDU, the data plane will forward the BPDU to the bridging process in the control plane to enable the bridging process to use the information contained in the BPDU to update a bridging database maintained by the control plane. The updates to the bridging database may then be used by the control process to update forwarding information programmed in the data plane, to adjust how the network element is operating on the network.

Thus, in a typical network element, the control plane runs at least one instance of control plane software which executes functions such as managing the hardware resources within that network element, as well as processing network protocols to allow communications among networks of switches.

The control plane software may run on one or more hardware CPU cores. A given CPU core has a limited or fixed resource capacity, due to its operating clock frequency and size of memory. This translates into a fixed overall budget for the number of CPU instructions and buffers that the CPU has available to process control packets, which further determines the maximum packet processing rate beyond which the CPU core is overloaded. To ensure real time processing of control packets, it is preferable to prevent the CPU core from becoming overloaded.

Several approaches have been proposed to prevent the control plane software running on the CPU core from being overloaded. For example, one common method is to use statically configured filter rules, commonly referred to as Access Control Lists (ACL) to filter control packets associated with unsupported protocols. Although this technique can prevent overloading of the CPU core, it suffers from denial of service to legitimate control packets in the presence of traffic anomalies due to loops and malicious attacks. For example, if a loop occurs in the network, or a denial of service attack is launched, a given network element may be inundated with control packets. Use of statically configured filter rules will limit the number of control packets that are passed to the control plane, potentially causing legitimate control packets to be dropped before they are able to be processed by the control plane. This results in a situation where the network element is not able to be controlled, since control packets are not reaching the control software. Further, this lack of control unfortunately coincides with a situation where control of the network element is imperative to enable the routing loop to be corrected or to enable the denial of service attack to be quashed.

Another approach to CPU overload protection is to use policers to rate limit different traffic types destined to the control plane. The problem with this approach is that it does not dynamically adapt to changes in the control plane system configurations.

SUMMARY OF THE DISCLOSURE

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A method and apparatus for control plane CPU overload protection enables traffic metering to adjust as ports and services are added to intelligently discern between excessive control plane traffic and acceptable levels of control plane traffic under various levels of operation. In one embodiment, control packets received at a network element are pre-classified and metered using dynamically configured meters. The meters are adjusted as ports are put into service or removed from service, and as services are applied to ports. In one embodiment the meters are implemented both on a per protocol and per port basis. As additional ports are activated and as a protocol is enabled on additional ports, the meters associated with the protocol are increased to accommodate increased amounts of control traffic at the network element. As ports are deactivated, the filters are likewise dynamically adjusted downwards to account for lower expected control volume from the fewer number of ports. CPU metering is likewise implemented on a per-CPU core basis, but the per-CPU meters are used to perform flow control rather than as thresholds for ejecting errant control traffic. The combination of control packet pre-classification, dynamic meter adjustment based on operational state of the network element, and CPU-based flow control metering provides robust CPU overload protection while allowing appropriate levels of control traffic to be provided to the control plane for processing, even in the event of a control traffic burst on one or more ports of the network element.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
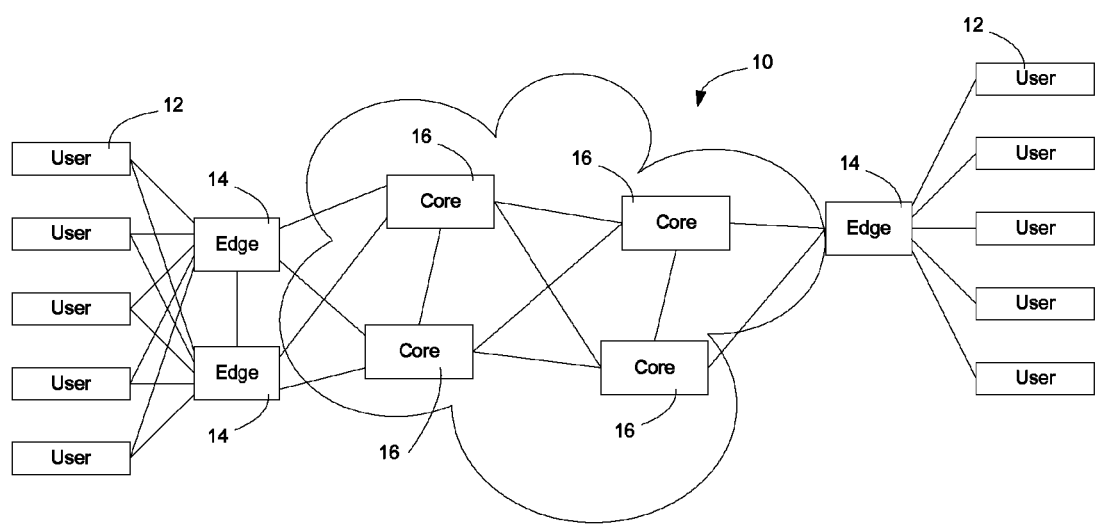
FIG. 1 is a functional block diagram of an example communication network.

FIG. 1 illustrates one embodiment of a communication network 10. As shown in FIG. 1, users 12 connect to edge network elements 14 to obtain communication services from the network, such as to communicate with other users or obtain access to data and applications available on the network. Core network elements 16 interconnect the edge network elements to enable data to be transmitted throughout the network. Many network configurations have been developed and the functional block diagram shown in FIG. 1 is merely intended to provide context for understanding embodiments of the invention.

The network elements communicate with each other by passing data to one another. In a packet network, data is transmitted in packets which may be multiplexed with other packets as it is transmitted through the network. For example, user A may request a file from user B. In response, packets of data may be transmitted from user B to user A over the network. The network elements 14, 16, transmit the data along with other data being transmitted on the network. To enable the network elements to function in this manner, the network elements implement a number of protocols. For example, at the physical level, the network elements utilize one or more protocols that specify how the data should be physically formatted, e.g. clock rate, signal form, and timing. To allow the network elements to find paths through the network, the network elements also typically implement a routing protocol that will allow the network elements to exchange information about the topology of the network. Example routing protocols may include Open Shortest Path First (OSPF), Intermediate System to Intermediate System (IS-IS), Spanning Tree Protocol (STP), etc. Other protocols may be implemented as well to allow the data to be secured while in transit and to allow the data to be disambiguated upon receipt at its destination.

To allow the network elements to interoperate, many of the protocols require the network elements to periodically or occasionally transmit control information. Control information that is transmitted on the network is generally mixed together with the other data traffic that is being transmitted on the network. Transmission of control information in control packets enables the network elements on the network to coordinate handling of data on the network. For example, from a routing perspective, transmission of routing information enables the network elements to have a synchronized view of the network topology and make consistent routing decisions for traffic on the network. Many protocols in addition to routing protocols may likewise be implemented on the network elements. As control packets are received at the data plane, they are passed to the control plane to enable the control plane software implemented in the control plane to be updated based on the newly received control information.

Some control protocols disseminate control information by causing control packets to be flooded on the network. For example, in a spanning tree protocol, control packets are flooded on the spanning tree to enable control information to be transmitted efficiently from the root of the tree to all of the leaf nodes. In the event of a routing loop, the same control packet will repeatedly be flooded on a portion of the tree, which will cause the control planes of the network elements in the affected portion of the tree to be overloaded as they attempt to process the same control packet multiple times. Likewise, a nefarious individual may seek to disrupt network operation by causing a large number of control packets to be directed at a particular node or set of nodes. This type of activity is commonly referred to as a denial of service attack. By repeatedly transmitting control packets to a given network element, the control plane can be overloaded, to effectively deny legitimate control traffic from being processed by the network element. This can cause the network element to cease operating properly to deny service to users who rely on that network element for communication services on the communication network.

According to an embodiment, a three prong approach is applied to prevent CPU overload. First, control packets are pre-classified prior to being metered. Pre-classifying the packets allows the packets to be metered according to properties of interest, such input port, input interface, control protocol, and based on a combination of these factors. The classified packets are metered to the CPU based on using dynamically configured meters, which enables rate limits to be dynamically adjusted based on the number of active ports on the network element that are actually configured on the network element. Finally, a second meter is implemented on a per-CPU core basis to enable flow control, but not packet discard, to be implemented on a per CPU core basis. The combination of these three features enables control anomalies to be detected and isolated, without causing CPU overload or affecting the ability of the network element to also process legitimate control traffic arriving via other non-affected ports and which is associated with other non-affected protocols.

Figure 2:
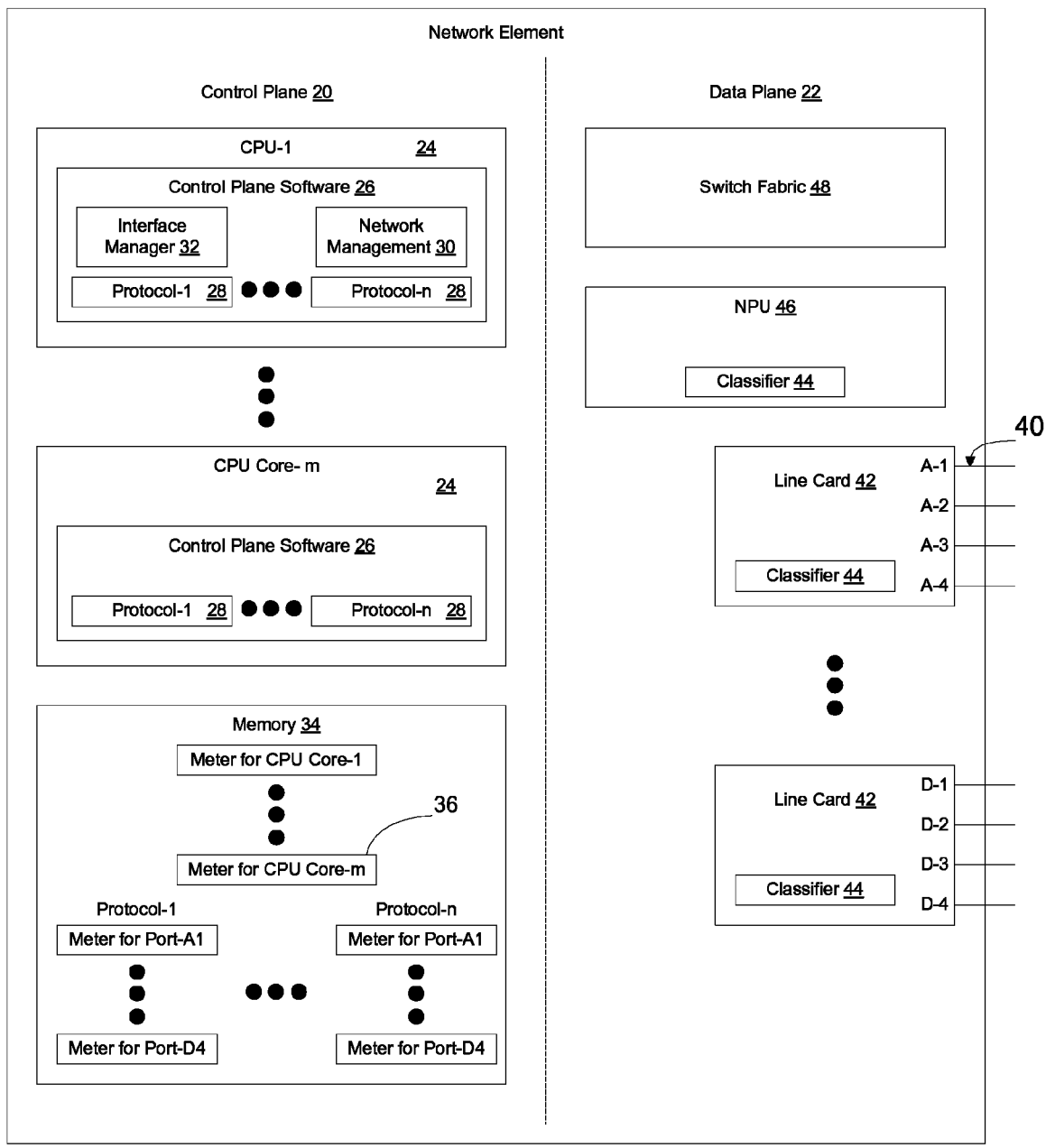
FIG. 2 is a functional block diagram of an example network element that may be used to implement an embodiment of the invention.

FIG. 2 shows an example network element that may be configured to implement CPU overload protection according to an embodiment of the invention. The invention is not limited to a network element configured as illustrated, however, as the invention may be implemented on a network element configured in many different ways. The discussion of the specific structure and methods of operation of the embodiment illustrated in FIG. 2 is intended only to provide one example of how the invention may be used and implemented in a particular instance. The invention more broadly may be used in connection with any network element configured to handle protocol data units on a communications network. The network element of FIG. 2 may be used as an edge network element 14 such as an edge router, a core network element 16 such as a router/switch, or as another type of network element. The network element of FIG. 2 may be implemented on a communication network such as the communication network described above in connection with FIG. 1 or in another type of wired/wireless communication networks.

As shown in FIG. 2, the network element includes a control plane 20 and a data plane 22. Control plane 20 includes one or more CPU cores 24, which may be physical CPU cores or a virtual machine running on a physical CPU core. Each CPU core is running control plane software 26, which may include, for example, one or more routing processes 28, network operation administration and management software 30, an interface creation/management process 32, and other processes.

The network element also includes memory 34 implementing meters 36. The memory may be implemented in the CPU cache or in memory external to the CPU. The meters enable packets to be metered at a desired granularity, such as on a per input port and per protocol basis, per interface/protocol basis, or on another basis. The meter assignment granularity depends on how finely grained the protocol classification is required to be. The illustrated embodiment shows separate meters implemented for each input port based on the protocol instantiated on the port. For example, if spanning tree protocol is implemented on ports A1-A4, the illustrated embodiment shows a separate meter to meter spanning tree BPDUs from each of ports A1-A4. Likewise, if OSPF were to be implemented on ports A2 and A3, the illustrated example would have separate meters to meter OSPF control traffic on each of ports A2 and A3. In another embodiment the meters may be less finely grained such as by collectively metering packets from multiple ports per protocol, or collectively metering packets from a single port which are associated with two or more protocols. Many ways of metering packets may be devised based on the manner in which the control traffic is to be handled at the control plane.

The data plane 22 includes ports 40 which connect with physical media to receive and transmit data. The physical media may include fiber optic cables or electrical wires. Alternatively, the physical media may be implemented as a wireless communication channel, for example using one of the cellular, 802.11 or 802.16 wireless communication standards. In the illustrated example, ports 40 are supported on line cards 42 to facilitate easy port replacement, although other ways of implementing the ports 40 may be used as well. The line cards may have some processing capabilities. For example, in the illustrated example the line cards 42 include a microprocessor or other hardware configured to implement a classifier 44 to perform pre-classification of the packets according to input port and protocol. Other processing may be implemented in the line cards and elsewhere in the data plane as is known in the art. Details associated with a particular implementation have not been included in FIG. 2 to avoid obfuscation of the salient features associated with an implementation of an embodiment of the invention.

The data plane 22 further includes a Network Processing Unit (NPU) 46 and a switch fabric 48. The NPU and switch fabric 48 enable data to be switched between ports to allow the network element to forward network traffic toward its destination on the network. Preferably the NPU and switch fabric operate on data packets without significant intervention from the control plane to minimize latency associated with forwarding traffic by the network element. In addition to directing traffic from the line cards to the switch fabric, the NPU also allows services such as prioritization and traffic shaping to be implemented on particular flows of traffic. Optionally, where pre-classification is not implemented in the line cards, the NPU may perform pre-classification.

As control packets are received by the data plane, they are passed from the NPU to the control plane. The pre-classification from classifiers 44 allows the control plane to identify which meter should be used to meter the packet to the CPU. According to an embodiment, all control packets destined to the CPU core are classified prior to being transmitted to the control plane on a per-input port and per-protocol type. Based on this classification, the control packets are then assigned, by the control plane, to one or more of the protocol meters. For example, OSPF Hello Control Packets received at port A-1 are assigned to a meter for Port-A1 and protocol-1. BPDU (spanning tree control packets) at port A-1 are assigned to the meter for Port-A1 and protocol-2. In effect, every control packet received at the network element is classified based on its ingress port and protocol, and then mapped by the control plane to a set of protocol meters which may also be implemented on a per port/protocol basis or at some lesser granularity. The meter assignment granularity depends on how finely grained the protocol classification is required to be.

If a control packet is received and there is no assigned meter for that type of control packet for that port, then the packet will be dropped. For example, if an OSPF Hello control packet is received on port D4, and a meter has not been created to meter OSPF packets received on port D4, then the OSPF control packet will be dropped. This may occur, for example, where OSPF has not been configured on port D4. Likewise, if a packet is received and its packet meter indicates that it is out-of-profile, the packet will be dropped. For example, if a meter has been created for OSPF packets on port A1, and the meter is established such that 1 packet per second is expected to be received on port A1. If 10 OSPF control packets are received on port A1 within half a second, some of the packets are likely to exceed the meter for that port/protocol and hence will be dropped.

When a packet is dropped, information such as the packet ingress port number, protocol type, etc., is logged. The log is then inspected by software where appropriate actions are taken. The actions may include procedures such as shutting down the offending port, setting an alarm, or other appropriate actions. In the above example, if 10 OSPF control packets were received, 9 of the packets may be discarded and a log may be created with information about the 9 received packets. This log may be passed to the network management process 30 which could shut down OSPF on port A1, notify a central network management center, and interact with an OSPF control process to correct the problem which is causing a surplus of OSPF control packets to be transmitted on the network.

Each CPU core that runs the control plane software is assigned a meter. Note that the CPU core may be a physical CPU core or a virtual machine running on a physical CPU core. This meter controls the overall or aggregate traffic load offered to the CPU core. This meter is statically configured such that the offered load does not overload the CPU core. This meter value is set proportional to the runtime of the tasks and functions that the CPU core is expected to execute at certain performance metrics. Every time a control packet is sent to the CPU core, this meter is updated and checked. If the selected protocol meter is in-profile, and the CPU meter indicates an out-of-profile state, then the packet is simply buffered external to the CPU core and not processed until the CPU has available capacity. This allows the CPU meter out-of-profile state to serve as a flow control for packets entering the CPU, but does not cause the CPU meter to cause packets to be discarded when out of profile.

According to an embodiment, the protocol meters are configured dynamically as configuration of the network element changes. Dynamic configuration, as user herein, is a defined term that means that the protocol meters are configured by the network element and changed to adapt to the current operating state of the network element. Dynamic configuration, unlike static configuration, allows meters to be created, destroyed, and adjusted as ports are activated/deactivated, and as protocols and other services are implemented or removed on the ports. Static configuration, by contrast, occurs in conventional network elements, for example during an initialization routine or by the user directly. The dynamic configuration allows the overload protection to adapt and adjust to the system runtime configuration. The protocol meters are actually configured directly by the control plane protocols and are transparent to the user.

The user is not required to configure the meters directly. Optionally, a user may set policy to be applied in connection with adjusting the meters. The policy, in this context, implies the ability of a user such as a network manager to specify the granularity of the protocol meters and expected traffic metrics, such as an expected number of control packets per active protocol instance per port in a given time period. Given the specified policy, however, the dynamic nature of the meter creation and adjustment enables the network element to apply the specified policy to adjust the meters as the configuration of the network element changes without requiring specific intervention by the network manager in connection with reconfiguration of the network element.

For example, if Spanning Tree Protocol (STP) is enabled on 10 ports, the meters regulating the flow of packets into the control plane are adjusted to allow an expected volume of control plane traffic from 10 STP ports. As additional STP ports are turned on, the meters are automatically adjusted based on metrics associated with the new ports and the STP service instantiated on the ports. The metrics are based on the amount of control plane traffic expected to be received, which may include consideration of the number and type of ports which are active at the time, and the types of services instantiated on the ports. Traffic anomalies are then judged based on the metrics associated with the number of ports open and the type of services configured on the active ports. As ports are added or services are configured on the ports, the metrics are used to adjust the meters to adaptively adjust what is considered to be a traffic anomaly. In this manner, the number of packets passed to the control plane may be adjusted dynamically to prevent overload of the control plane.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing control plane CPU overload protection, the computer program comprising a set of instructions which, when executed by a computer, cause the computer to perform a method comprising the steps of:
    pre-classifying control packets in a data plane of a network element;
    metering the pre-classified control packets using dynamically configured meters, the dynamically configured meters having rates based on a number and type of service enabled on ports of the network element; and
    metering control packets which pass the dynamically configured meters using per CPU core meters to implement flow control;
    wherein the dynamically configured meters enable rate limits to be dynamically adjusted based on a number of active ports on the network element.

2. The non-transitory tangible computer readable storage medium of claim 1, wherein pre-classifying control packets comprises identifying input port and control protocol for the control packets.

3. The non-transitory tangible computer readable storage medium of claim 2, wherein the step of pre-classifying control packets results in control packets classified according to input port and protocol, and wherein the step of metering the pre-classified control packets using dynamically configured meters is implemented using individual meters configured to meter control packets on a per input port per protocol basis.

4. The non-transitory tangible computer readable storage medium of claim 2, wherein the step of pre-classifying control packets results in control packets classified according to input port and protocol, and wherein the step of metering the pre-classified control packets using dynamically configured meters is implemented using collective meters configured to meter control packets from multiple ports per protocol.

5. The non-transitory tangible computer readable storage medium of claim 2, wherein the step of pre-classifying control packets results in control packets classified according to input port and protocol, and wherein the step of metering the pre-classified control packets using dynamically configured meters is implemented using collective meters configured to meter control packets from one port which are associated with two or more protocols.

6. The non-transitory tangible computer readable storage medium of claim 1, further comprising the step of assigning pre-classified packets to the meters based on the result of the step of preclassifying the packets.

7. The non-transitory tangible computer readable storage medium of claim 1, further comprising the step of selecting individual dynamically configured meters for the control packets based on the step of pre-classifying the control packets.

8. The non-transitory tangible computer readable storage medium of claim 1, wherein the dynamically configured meters meter control packets on a per input port per protocol basis.

9. A non-transitory tangible computer readable storage medium having stored thereon a computer program for implementing control plane CPU overload protection, the computer program comprising a set of instructions which, when executed by a computer, cause the computer to perform a method comprising the steps of:
- re-classifying control packets in a data plane of a network element;
- metering the pre-classified control packets using dynamically configured meters, the dynamically configured meters having rates based on a number and type of service enabled on ports of the network element; and
- metering control packets which pass the dynamically configured meters using per CPU core meters to implement flow control;
- wherein the dynamically configured meters meter control packets on a per input port per protocol basis; and
- wherein if a control packet is received and a meter does not exist for control packets from the input port and protocol associated with the control packet, then the control packet will be dropped.

10. The non-transitory tangible computer readable storage medium of claim 8, wherein the dynamically configured meters meter control packets on a per interface per protocol bases.

11. The non-transitory tangible computer readable storage medium of claim 1, wherein if a control packet is received and a selected meter for the packet indicates that the packet is out-of-profile, the control packet will be dropped.

12. A non-transitory tangible computer readable storage medium having stored thereon a computer program for implementing control plane CPU overload protection, the computer program comprising a set of instructions which, when executed by a computer, cause the computer to perform a method comprising the steps of:
- re-classifying control packets in a data plane of a network element;
- metering the pre-classified control packets using dynamically configured meters, the dynamically configured meters having rates based on a number and type of service enabled on ports of the network element; and
- metering control packets which pass the dynamically configured meters using per CPU core meters to implement flow control;
- wherein the dynamically configured meters are configured automatically and changed to adapt to the current operating state of the network element.

13. The non-transitory tangible computer readable storage medium of claim 12, wherein the current operating state of the network element is based on the number of active ports and the control plane protocols activated on the active ports.

14. The non-transitory tangible computer readable storage medium of claim 12, wherein the current operating state is combined with user specified policy to set limits for the dynamically configured meters.

15. The non-transitory tangible computer readable storage medium of claim 1, wherein the per-CPU core meters control the overall or aggregate traffic load offered to the CPU core.

16. A non-transitory tangible computer readable storage medium having stored thereon a computer program for implementing control plane CPU overload protection, the computer program comprising a set of instructions which, when executed by a computer, cause the computer to perform a method comprising the steps of:
- re-classifying control packets in a data plane of a network element;
- metering the pre-classified control packets using dynamically configured meters, the dynamically configured meters having rates based on a number and type of service enabled on ports of the network element; and
- metering control packets which pass the dynamically configured meters using per CPU core meters to implement flow control;
- wherein the per-CPU core meters control the overall or aggregate traffic load offered to the CPU core; and
- wherein if a control packet is received and the CPU core meter is out-of-profile, then the control packet will be buffered external to the CPU core and not processed until the CPU has available capacity.

17. A non-transitory tangible computer readable storage medium having stored thereon a computer program for implementing control plane CPU overload protection, the computer program comprising a set of instructions which, when executed by a computer, cause the computer to perform a method comprising the steps of:
- re-classifying control packets in a data plane of a network element;
- metering the pre-classified control packets using dynamically configured meters, the dynamically configured meters having rates based on a number and type of service enabled on ports of the network element; and
- metering control packets which pass the dynamically configured meters using per CPU core meters to implement flow control;
- wherein the per-CPU core meters control the overall or aggregate traffic load offered to the CPU core; and
- wherein out-of-profile control packets are not caused to be discarded by the per-CPU core meters.

18. The non-transitory tangible computer readable storage medium of claim 1, further comprising the step of detecting a traffic anomaly based on metrics associated with a number of active ports and types of services configured on the active ports.

19. The non-transitory tangible computer readable storage medium of claim 9, wherein the dynamically configured meters enable rate limits to be dynamically adjusted based on a number of active ports on the network element.

20. The non-transitory tangible computer readable storage medium of claim 12, wherein the dynamically configured meters enable rate limits to be dynamically adjusted based on a number of active ports on the network element.

* * * * *